Aug. 7, 1951  E. V. RIPPINGILLE  2,563,371

ENGINE RECIPROCATING UNIT

Filed June 14, 1950

Inventor
Edward V. Rippingille

By
Willits, Hardman & Fehr.
Attorneys

Patented Aug. 7, 1951

2,563,371

UNITED STATES PATENT OFFICE 2,563,371

ENGINE RECIPROCATING UNIT

Edward V. Rippingille, Farmington, Mich., assignor to General Motors Corporation, Dayton, Ohio, a corporation of Delaware Application June 14, 1950, Serial No. 168,122

7 Claims. (Cl. 309—16)

This invention relates to a unit reciprocable within a cylinder of a combustion engine.

An object of my invention is to provide an improved simplified piston and connecting rod unit which is of light weight and easily assembled.

Another object of my invention is to provide a piston for an internal combustion engine with means for relieving parts of the piston from direct shock of combustion so as to avoid strain and excessive wear on the parts.

A further and more specific object of my invention is to connect a wrist pin carrier to a piston and to provide the connection with a cushioning means in the form of a hollow sealed metal ring which exerts pressure evenly adjacent to and throughout the circumference of the piston.

Further objects and advantages of the present invention will be apparent from the following description, reference being had to the accompanying drawings, wherein a preferred form of the present invention is clearly shown.

Figure 1:
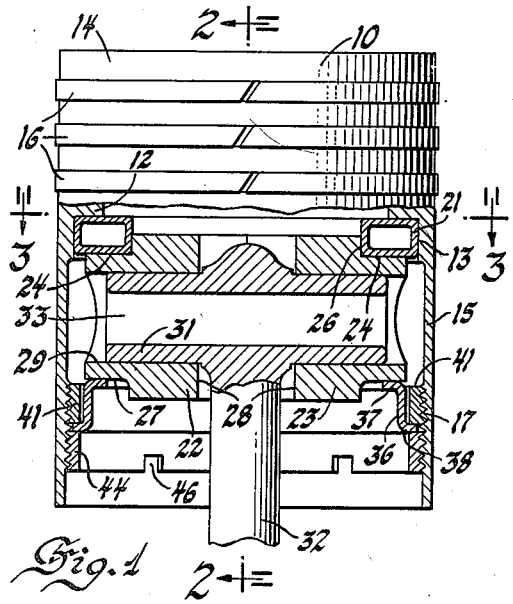
Fig. 1 is a view partly in elevation and partly in section of a unit constructed in accordance with my invention.
Figure 2:
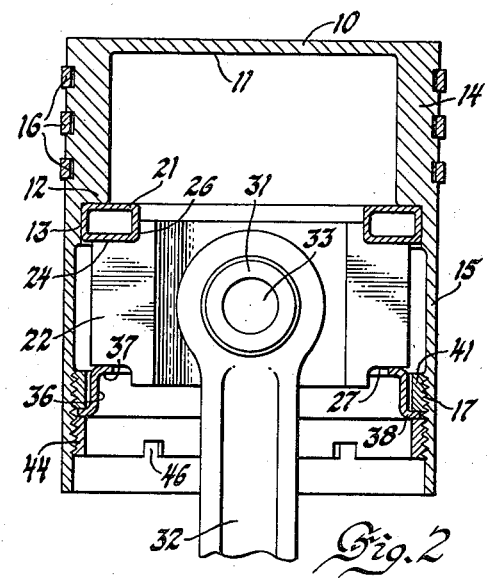
Fig. 2 is a vertical sectional view of the unit taken on the line 2—2 of Fig. 1.
Figure 3:
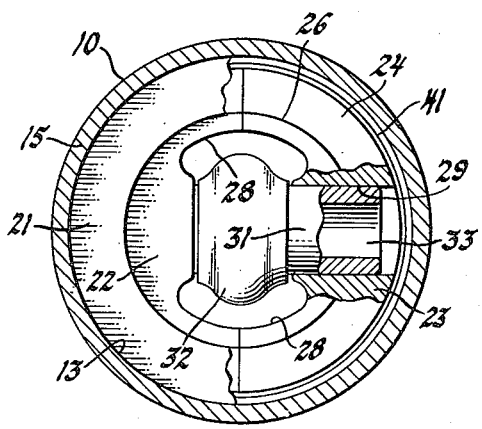
Fig. 3 is a horizontal sectional view taken on the line 3—3 of Fig. 1 with parts of the unit broken away to more clearly illustrate the structure thereof.

Referring to the drawings, for illustrating my invention, I have shown a unit comprising a piston having an actuating means or connecting rod attached thereto. The piston is adapted to be actuated or reciprocated within a cylinder of an internal combustion engine by the connecting rod operated from a crankshaft of the engine. The piston 10 of the reciprocable unit is made of steel and is provided with a closed end 11 (see Fig. 2). Piston 10 is hollowed out and provided with an internal peripheral shoulder 12 adjacent a vertically extending finished surface 13. This shoulder 12 partitions the piston into an upper head portion 14 and a skirt portion 15 depending therefrom. The piston 10 is provided with a plurality of grooves extending around the head portion 14 thereof for receiving split rings 16 as is conventional in the art. The skirt portion 15 of piston 10 is provided with internal threads 17 for a purpose to be hereinafter described. By hollowing out the piston 10 as shown its weight is greatly minimized and in order to further carry out the desideratum of weight reduction in a unit of the type described I provide the piston 10 with a separate wrist pin carrier perfectly formed of aluminum or other light weight metal. I connect the wrist pin carrier to piston 10 by light weight members and provide a cushioning means between the wrist pin carrier and its connection with the piston for a purpose to be hereinafter described.

Figure 4:
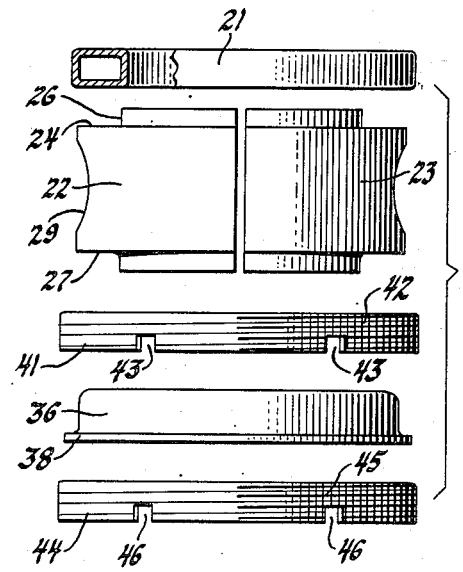
Fig. 4 is a bracketed view showing several parts of the unit before assembly into the piston thereof.

A hollow sealed steel doughnut-like ring 21, of rectangular shape in vertical cross section, abuts the peripherial internal shoulder 12 within piston 10 and extends therearound. Ring 21 can be made of steel tubing with the abutting ends welded or otherwise secured together or it can be made by wrapping up flat stock and sealing the seam at the abutting edges of the stock. The ring 21 is continuous and engages the piston 10 closely adjacent its outer circumference. A wrist pin carrier, which in the present disclosure comprises two companion semi-circular half parts 22 and 23 (see Fig. 4), is mounted in the piston 10. The upper portion of the two parts 22 and 23 of the wrist pin carrier is cut away to provide a shoulder 24 and a lip portion 26 extending above the shoulder. The lower portion of the two parts 22 and 23 of the wrist pin carrier is cut away to provide a shoulder 27. Each part 22 and 23 of the wrist pin carrier is provided with a semi-circular cut away portion 28, forming a vertical opening for the reception of the upper part of a piston actuating means or connecting rod, and a horizontal hole 29 forming bearings for a wrist pin. A wrist pin 31 is formed integral with a connecting rod 32 and is hollowed out as at 33 to reduce its weight. The separate wrist pin carrier comprising the two parts 22 and 23 is held against the cushioning ring 21 and connected to piston 10 by a circular sheet metal member 36, flanged inwardly at 37 to abut against the parts 22 and 23 of the pin carrier and also flanged outwardly at 38 for connection to the skirt portion 15 of piston 10. A metal band 41, externally threaded as at 42 and provided with wrench receiving notches 43 (see Fig. 4), is secured to and located within piston 10 and the flange 38 on member 36 abuts the same. Another metal band 44, also externally threaded as at 45 and provided with wrench receiving notches 46 (see Fig. 4), is secured to and located within piston 10 to engage and lock the member 36 in place.

In assembling the reciprocable unit described the piston rings 16 are placed in their respective grooves in piston 10 in any conventional or well known manner and thereafter the inner elements of the unit are placed into the piston. Hollow ring 21 is inserted into the piston 10 and placed against the peripheral shoulder 12. The one metal band 41 is threaded, on the piston threads 17, into the piston 10. A gauge or the like instrument may be inserted into the piston to measure the distance between ring 21 and the lower edge of band 41 so as to determine the proper amount of threading of band 41 into the piston to insure tight clamping of the wrist pin carrier to hollow ring 21. The integral wrist pin portions extending laterally from opposite sides of the upper end of connecting rod 32 are then inserted into the openings 29 in parts 22 and 23 of the wrist pin carrier and the flat surfaces of these parts 22 and 23 are moved into engagement with one another so as to form a cylindrical carrier. This sub-unit, comprising the parts 22, 23 and the connecting rod 32 having the integral pin 31, is moved into the piston 10 to cause the shoulder 24 on the wrist pin carrier to engage the hollow metal ring 21. Clamping member 36 is placed into the piston 10 with its flange 37 engaging the shoulder 27 on the wrist pin carrier parts 22 and 23 and thereafter the band 44 is threaded, on the piston threads 17, into the piston and against the clamping member 36 to lock this member in place and connect all of the elements to the piston.

It will be noted that the construction and arrangement of the piston 10, ring 21 and the wrist pin carrier, comprising the parts 22 and 23, in the vicinity of abutment of these elements is such that the outer vertical wall of ring 21 contacts the finished surface 13 in the piston, the bottom horizontal wall of ring 21 contacts the shoulder 24 on the wrist pin carrier, the top horizontal wall of ring 21 contacts the peripheral shoulder 12 in piston 10 and the inner vertical wall of ring 21 contacts the lip portion 26 of the wrist pin carrier. The ring 21 is made hollow with air sealed therein and the manner in which it is clamped between the piston 10 and the circular wrist pin carrier inherently provides the ring with a certain amount of compressibility. This compressibility of ring 21 is utilized in the present invention to form a cushioning means for the connection of the wrist pin carrier to the piston 10. One purpose of this cushioning means is to relieve the clamping member 36 of any shock load and particularly a reverse load thereon such as when combustion takes place above the piston 10. Another purpose of the cushioning means, afforded by the hollow sealed ring 21, is to pre-load the wrist pin bearing components so that wear between the elements comprising the reciprocating unit will be reduced and the elements will remain quiet during reciprocation of the unit. By virtue of the sealed hollow ring 21 engaging the shoulder 12 in piston 10 adjacent its outer periphery, forces exerted either by the piston actuating means, rod 32, to the piston or by the force of combustion applied to the component parts of the unit are divided substantially equal throughout the circumference of the piston. This causes the piston to remain in alignment with the cylinder in which it is to be reciprocated and any wear on the cylinder walls, piston 10 or its rings 18 takes place evenly throughout the circumference thereof.

It should be apparent that I have provided a light weight reciprocating unit for engines which is simple in construction and easily assembled to thus reduce manufacturing costs thereof. By providing a two-part wrist pin carrier of light weight metal I eliminate the necessity of providing wrist pin bearings in the piston casting. Also by making the wrist pin integral with the connecting rod and hollowing out the pin I further reduce the weight of the unit and eliminate use of bolts ordinarily employed to lock a wrist pin to a connecting rod. The improved cushioning means employed in my reciprocating unit distributes shock loads placed on the unit evenly around the circumference of the piston to thereby eliminate the tendency of the piston to move laterally with respect to the cylinder in which it reciprocates.

While the form of embodiment of the invention as herein disclosed, constitutes a preferred form, it is to be understood that other forms might be adopted, as may come within the scope of the claims which follow.

What is claimed is as follows:

1. A unit adapted to be reciprocated within a cylinder of an internal combustion engine comprising in combination, a piston, means connected to said piston for actuating the same, and a compressible hollow sealed metal ring interposed between said actuating means and said piston for cushioning the connection therebetween.

2. A unit adapted to be reciprocated within a cylinder of an internal combustion engine comprising in combination, a piston, means connected to said piston for actuating the same, and a hollow metal ring interposed between said actuating means and said piston for cushioning the connection therebetween, said ring engaging said piston closely adjacent to and continuously throughout the circumference thereof.

3. A unit adapted to be reciprocated within a cylinder of an engine comprising in combination, a hollow piston closed at one end and having an internal peripheral shoulder partitioning the piston into a head portion and a skirt portion depending therefrom, a separate wrist pin carrier within and connected to said piston, said carrier having openings therein forming bearings, a connecting rod extending from said piston, a pin within said bearings attaching said rod to said carrier, and means for cushioning the connection of said pin carrier to said piston, said cushioning means comprising a hollow metal ring interposed between said shoulder in the piston and said pin carrier.

4. A unit adapted to be reciprocated within a cylinder of an engine comprising in combination, a hollow piston closed at one end and having an internal peripheral shoulder partitioning the piston into a head portion and a skirt portion depending therefrom, a two-part wrist pin carrier within and connected to said piston, each part of said two-part pin carrier having an opening therein forming bearings, a connecting rod extending from said piston and having an integral pin extending laterally from opposite sides thereof into said bearings, and means for cushioning the connection of said pin carrier to said piston, said cushioning means comprising a hollow sealed metal ring interposed between said shoulder in the piston and said pin carrier.

5. A unit adapted to be reciprocated within a cylinder of an engine comprising in combination, a hollow piston closed at one end and having an internal peripheral shoulder partitioning the piston into a head portion and a skirt portion depending therefrom, a separate wrist pin carrier within and connected to said piston, said wrist pin carrier having a shoulder in vertical opposed relation to said shoulder in the piston, said carrier having openings therein forming bearings, a connecting rod extending from said piston, a pin within said bearings attaching said rod to said carrier, and means for cushioning the connection of said pin carrier to said piston, said cushioning means comprising a hollow metal ring of rectangular shape in cross section having its top wall abutting said shoulder in said piston and having its bottom wall abutting said shoulder on said pin carrier.

6. A unit adapted to be reciprocated within a cylinder of an engine comprising in combination, a hollow piston closed at one end and having an internal peripheral shoulder partitioning the piston into a head portion and a skirt portion depending therefrom, a two-part wrist pin carrier within and connected to said piston, each part of said two-part pin carrier having its upper surface cut out to form a shoulder in vertical opposed relation to said shoulder in the piston, each part of said pin carrier also having an opening therein forming bearings, a connecting rod extending from said piston and having an integral pin extending laterally from opposite sides thereof into said bearings, and means for cushioning the connection of said pin carrier to said piston, said cushioning means comprising a hollow sealed metal ring of rectangular shape in cross section having its top wall abutting said shoulder in said piston and having its bottom wall abutting said shoulder on said pin carrier.

7. A unit adapted to be reciprocated within a cylinder of an engine comprising in combination, a hollow piston closed at one end and having an internal peripheral shoulder partitioning the piston into a relatively thick walled head portion and a relatively thin walled skirt portion depending therefrom, a two-part wrist pin carrier within and connected to said piston, a hollow sealed metal ring cushioning member disposed between said shoulder in the piston and said pin carrier, and means for locking the pin carrier connector to said piston in position.

EDWARD V. RIPPINGILLE.

REFERENCES CITED

The following references are of record in the file of this patent:

UNITED STATES PATENTS

| Number | Name | Date |
| --- | --- | --- |
| 1,450,177 | Houpert | Apr. 3, 1923 |
| 1,603,135 | Mayes | Oct. 12, 1926 |